(No Model.) 2 Sheets—Sheet 2.

T. OLDROYD.
COTTON BEATER.

No. 357,783. Patented Feb. 15, 1887.

Witnesses:
Joseph Michael
Charles E. Brainard

Inventor:
Thomas Oldroyd (No Model.) 2 Sheets—Sheet 1.

T. OLDROYD.
COTTON BEATER.

No. 357,783. Patented Feb. 15, 1887.

Witnesses: Thomas Oldroyd Inventor.
Charles A. Hill
Nay A. Hill

UNITED STATES PATENT OFFICE.

THOMAS OLDROYD, OF NEW LONDON, CONNECTICUT.

COTTON-BEATER.

SPECIFICATION forming part of Letters Patent No. 357,783, dated February 15, 1887.

Application filed February 25, 1886. Serial No. 193,254. (No model.)

*To all whom it may concern:*

Be it known that I, THOMAS OLDROYD, a citizen of Great Britain, residing at New London, in the county of New London and State of Connecticut, for over one year last past, have invented certain new and useful Improvements in Cotton-Beaters adapted for Working Cotton, Woolen, and Silk and other Fibers; and I do declare the following to be a full, clear, and exact description of the invention, such as will enable others skilled in the art to which it appertains to make and use the same, reference being had to the accompanying drawings, making part of this specification, in which—

Figure 3:
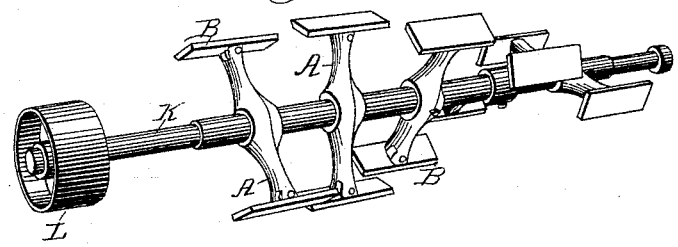
Figure 4:
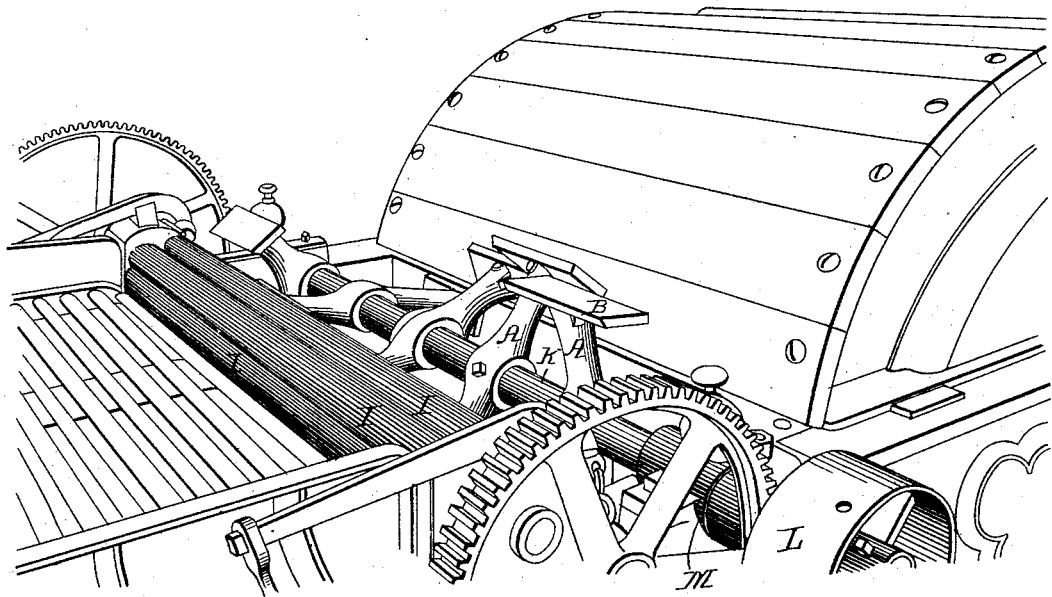
Figure 1:
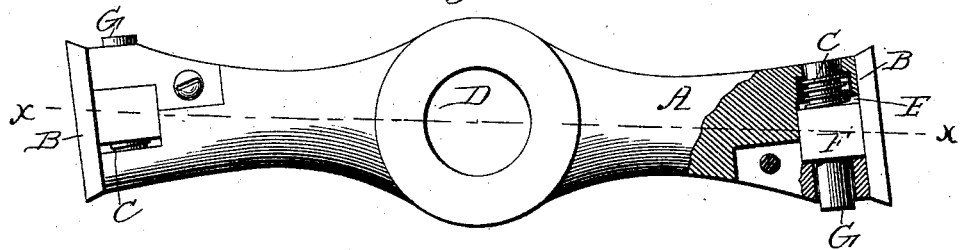
Figure 2:
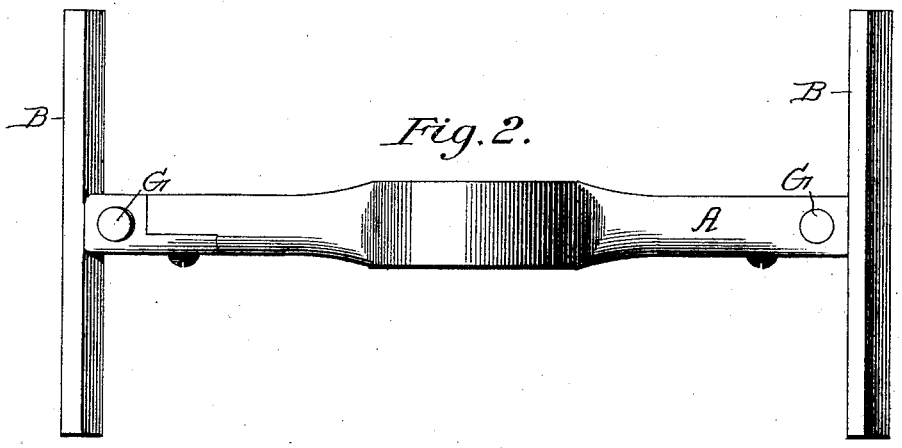

Figure 1 represents a side elevation, partly in section, of a beater constructed according to the invention. Fig. 2 represents a top view thereof. Fig. 3 represents a beater complete. Fig. 4 represents a portion of a machine with the beater in position for working, with the top cover removed.

This invention relates to beaters for cotton openers and lappers; and it consists of rigid arms A, as in Figs. 1 and 2, each arm being provided with a movable or sensitive blade, B, which is mounted on the outer end of the arm and will yield upon striking any hard substance passing between the feed-rolls I, Fig. 4. The blades are set at an angle of one hundred and five degrees, or thereabout, from a line through the center of the arm A, said line being indicated by the dotted line $x\,x$ in Fig. 1. When the blade comes in contact with hard substances it will yield by compressing a spiral spring, C, until past the feed-rolls I, and will then return to its former position.

The center axle or main shaft of the beater has journals which revolve in bearings in the frame. To the center portion of the shaft are secured the arms, and to the outer end is secured the driving-pulley.

The main shaft is a solid shaft, and each arm is provided with a hole, D, in the center, to admit the main shaft. Each arm is independent of the rest and has two independent blades on its outer ends. The blades are similar to blades used on rigid beaters. The outer ends of each arm are provided with a slot, E, said slot being parallel with the main shaft. This slot is to admit projection F on the under side of the blade, and is of a width greater than that of the projection, to permit the desired yielding of the blade. The blades are secured to the arm by a pin, G, which passes through the sides of the slot and through the projection. This pin is driven tightly into the projection, and has a loose fit in the sides of the slot. The back side of the slot is counterbored on the inner side to admit a spiral spring, C, which normally keeps the blade in its forward position, but permits it to yield when it strikes any hard substance. The blade receives its bearings on the outer end of the arm and the ends of the projection also receive a bearing in the bottom of the slot.

I claim as my invention—

The combination, with the beater-arm and the independent beater-blade having a projecting portion fitting a socket in the end of said arm, of the retaining-pin, and the spring for permitting movement of said blade upon said arm, substantially as described.

In testimony whereof I affix my signature in presence of two witnesses.

THOMAS OLDROYD.

Witnesses:
T. MICHAEL,
S. F. SAMUEL.